Figure 1:
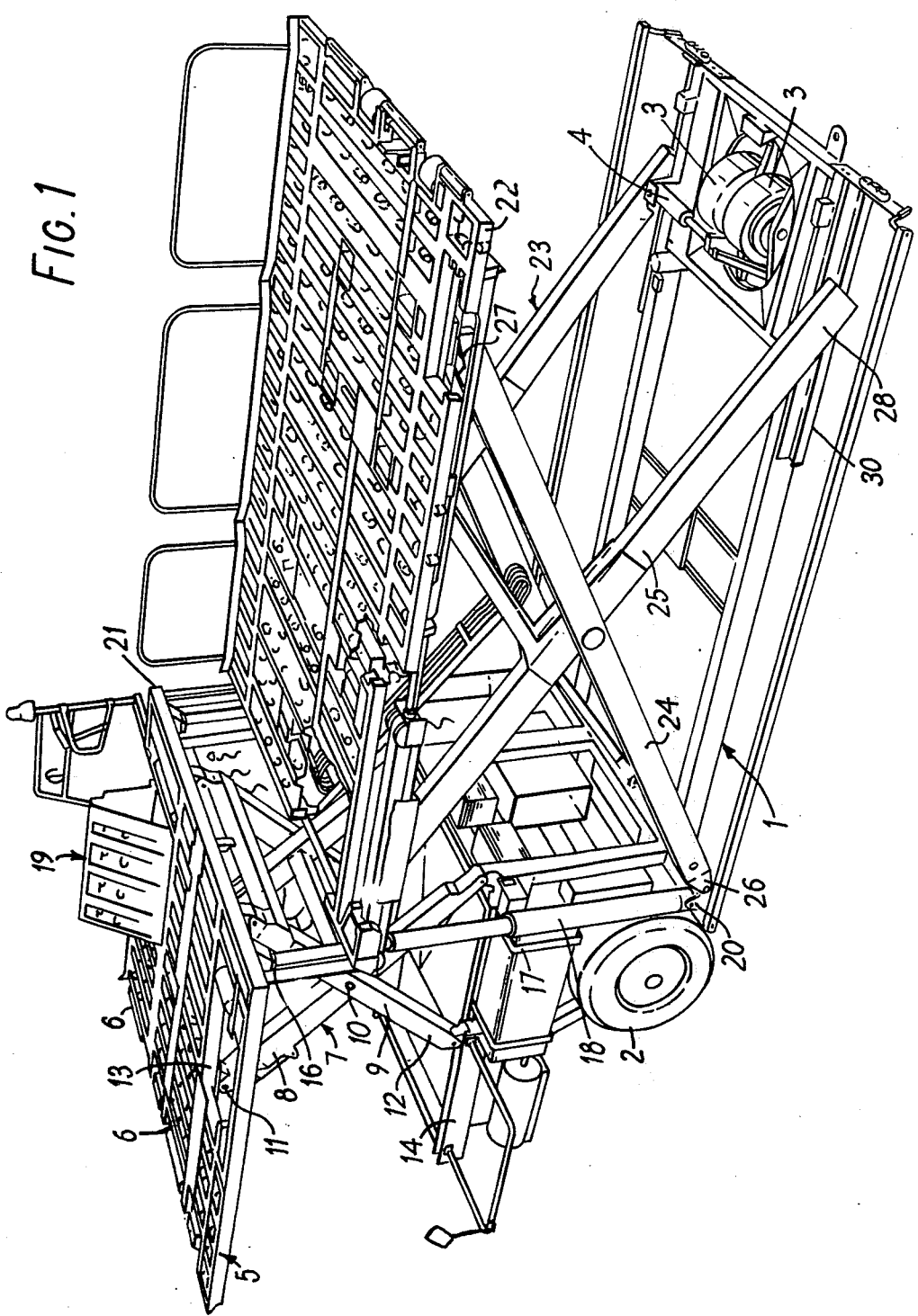

United States Patent [19]

Jones

[11] 4,010,826
[45] Mar. 8, 1977

[54] CARGO LOADING VEHICLES

[75] Inventor: Rodney Vernon Jones, Rochford, England

[73] Assignee: Atel Products Limited, Southend-on-Sea, England

[22] Filed: Mar. 20, 1975

[21] Appl. No.: 560,195

[30] Foreign Application Priority Data

Mar. 22, 1974 United Kingdom ............. 12931/74

[52] U.S. Cl. .................................. 187/26; 187/9 R; 187/20; 214/512; 254/144; 254/189
[51] Int. Cl.² ........................................ B66B 11/04
[58] Field of Search ................... 214/512, 84, 75 T; 187/8.41, 20, 8.59, 8.71, 9 R, 8.72, 26.27; 254/144, 189

[56] References Cited

UNITED STATES PATENTS

| | | | |
|---|---|---|---|
| 2,538,517 | 1/1951 | Hayden | 214/75 |
| 2,701,654 | 2/1955 | Williamsen | 254/189 X |
| 2,824,659 | 2/1958 | Erlinder | 214/75 T X |
| 3,275,170 | 9/1966 | MacRae et al. | 214/75 T |
| 3,666,127 | 5/1972 | Guyaux | 214/512 |

*Primary Examiner*—Albert J. Makay
*Attorney, Agent, or Firm*—Lon H. Romanski

[57] ABSTRACT

A cargo loading vehicle for loading cargo on to and from aircraft, which has two lifting platforms. One lifting platform is raised to aircraft door sill level and the other is liftable to the same level by spaced apart cables anchored to the one platform. The other platform is raised by drawing on the cables.

9 Claims, 2 Drawing Figures

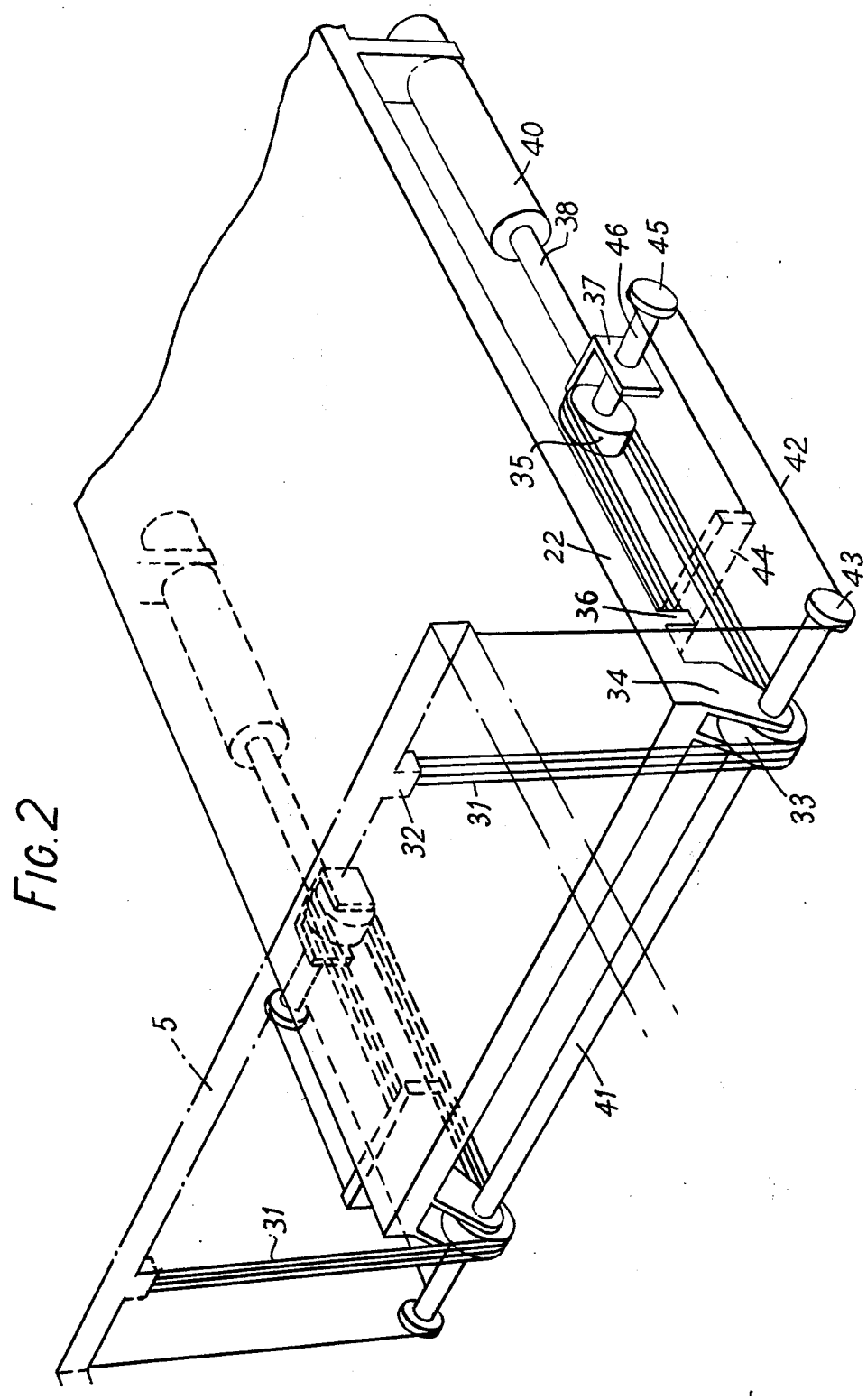

CARGO LOADING VEHICLES

This invention relates to cargo loading vehicles and is more particularly although not exclusively concerned with a vehicle which is suitable for loading aircraft.

It is to be understood that the term loading has been used herein to refer to vehicles which are used not only for loading but also for unloading.

Normally such cargo loading vehicles have to be arranged so that they can accept pallet and container loads at a maximum height above ground level of approximately 20 inches, being the normal standard height for various transporter dollies and the like in the aircraft industry. The vehicles must also be capable of discharging and accepting loads into and from aircraft at their cargo door still levels which may vary from 10 feet to 20 feet above ground level.

Vehicles of this kind and with which the invention is concerned normally comprise two lifting platforms namely a forward lifting platform and a main lifting platform, the forward lifting platform being raised to the height of the door sill level whilst the main lifting platform is that used for rasising the loads from the ground level up to the door sill height. The two platforms are arranged to be raised independently of one another and are raised by scissor lift assemblies.

The platforms are mounted on scissor lifts and such assemblies at present in use are provided with rams which are pivoted so that they move with the scissor lift beam and this has the disadvantage that the maximum lifting force is available only at the higher parts of the platform movement, and negligiable lifting force is available at the time that the platform rises from its lowest position. This has led to the introduction of auxiliary rams at the lowest position, and problems arise in accommodating either or both types of lifting rams within the 20 inches from ground level which is available.

It has also been proposed to use vertically lifting rams at the four corners of the platform, or to use one cylinder operating through levers and ropes onto the four corners of the platform, so that the platform is pulled up by the cables which run over sheaves mounted on posts, The posts however tend to obstruct the free passage of goods onto and off the platform.

It is an object to the present invention to overcome the above drawbacks.

A cargo loading vehicle according to the present invention comprises a forward lifting platform and a main lifting platform each of which is movable between a lowered position and a raised position by lifting means, one of the said lifting means comprising two spaced apart cables each of which has one end attached to one platform and arranged with respect to the other platform so that hoisting means associated with each cable and acting on the cables cause the other platform to be raised to the level of the first platform. Thus with this arrangement the hoisting means may be mounted below the other platform to avoid obstruction above the platform.

Conveniently the other ends of the cables are coupled to the other platform and preferably the hoisting means acts in conjunction with a pulley system over which the cables pass. In addition the cables may be arranged to pass over the further pulleys arranged directly below the anchor points of connection to the one platform.

The hoisting means preferably comprise hydraulic cylinders mounted horizontally beneath the other platform and conveniently adjacent to the respective sides of the platform, and parallel to its longitudinal axis.

Preferably also synchronising means are included for synchronising the movements of the cables so that the platform does not rise unevenly, particularly with uneven distribution of loads. The synchronising means conveniently comprises a torque tube interconnecting two pulleys over which the respective cables pass. In addition lift stabilising chains may be included.

Although the cables may be in the form of wire rope and the like they are preferably in the form of chains.

The lifting means preferably act to raise the main platform whilst the front platform is raised by hydraulic rams conveniently disposed to raise two adjacent corners. With this arrangement the full load of both platforms is carried through the hydraulic rams and these do not have to be confined within 20 inch height as the front platform does not have to lower to 20 inch height.

The first platform is therefore brought up to the highest point allowed by the front platform automatically and no adjustment is required on the part of an operator. Moreover the configuration allows cylinders to be used in the vertical position fully supported for the length of the cylinder body or at any point along it so as to provide maximum stability in compression, together with cylinders mounted horizontally in such fashion they present no difficulty in achieving the low required loading height of the platform accepting loads from other transport.

The invention may be performed in various ways and one specific embodiment will now be described by way of example with reference to the accompanying drawings in which:

FIG. 1 is a isometric view of a cargo loading vehicle according to the present invention and, FIG. 2 is detailed view of the lifting apparatus.

In the arrangement shown in the Figures the vehicle comprises a chassis as indicated generally at 1 upon which are mounted forward support wheels 2 only one of which is visible and rear support wheels 3, the front support wheels 2 being mounted at the outside of the vehicle and being fixed (i.e. non steerable) whilst the rear wheels 3 are steerable and are actuated by means of hydraulic rams 4 which thus steer the vehicle from the rear. As can be seen from the drawing the rear wheels are mounted adjacent the rear centre of the vehicle.

Mounted above the forward wheels 2 is a front lifting platform indicated generally at 5 having a series of conventional rollers 6 on its upper surface for movement of cargo. A scissor lift indicated at 7 comprises beams 8 and 9 pivoted at 10 and arranged in the conventional fashion to have sliding ends 11 and 12 sliding respectively on runners 13 on the platform and 14 rigidly supported on the vehicle above and forwardly of the front wheels 2. The rear end of the arms are respectively pivoted at 16 to the platform and at 17 to the vehicle chassis.

The forward platform 5 is arranged to be lifted by two three stage rams 18 on either side the lower ends of which are coupled at 20 to the main chassis of the vehicle 1 and at 21 to the forward lifting platform.

The vehicle is driven from a front control cabin 19, and can be controlled from outside when in use.

The rear lifting platform comprises a platform 22 beneath which is a scissor assembly indicated at 23 having arms 24 and 25 on each side the arms 24 being pivoted to the chassis at 26 and sliding in runners (not shown) at their upper ends 27 whilst the arms 25 are pivoted at their upper ends to the platform 22 and have their lower ends 28 sliding in runners 30 on the chassis.

As can be more clearly seen from FIG. 2 the lifting mechanism for raising the platform 22 comprises two cables in the form of chains (shown schematically) indicated at 31 attached at their ends 32 to the underside of the rear edge of the forward lifting platform 5 and descend vertically downwards, pass over pulleys 33 mounted on brackets 34, then pass rearwardly over further pulleys 35 and then forwardly again and have their other ends connected at 36 to the underside of the main platform 22. The pulleys 35 are rotationally mounted in bifurcated brackets 37 which are movable horizontally and are connected to the actuating members 38 of hydraulic rams 40. It will thus be seen that when the actuating members 38 of the rams 40 are moved rearwardly the chains are moved in a 2 to 1 ratio over the pulleys 35 and the platform 22 is hoisted upwardly to the level of the forward platform 5. When this level is reached the platform will automatically be at the correct level, and no adjustment will be required on the part of an operator.

In order to ensure that the cylinders are synchronised the pulleys 33 are secured to a torque shaft 41 to ensure that the chains move evenly. In addition lift stablising chains 42 pass over further pulleys 43 connected to the torque shaft 41, the chains 42 being anchored at one end to the platform 5 and at the other end to the platform 22 at 44 as indicated and passing over pulleys 45 connected by shafts 46 to the pulleys 35.

Whilst the arrangement has been described with chains wire rope or other suitable cable could be used. Moreover although it is more convenient to raise the main platform by the lifting apparatus it may in some circumstances be more convenient to raise the forward platform. In either case only one platform has to be contained within the 20 inch height necessary to accept the loads.

I claim:

1. A cargo loading vehicle comprising a forward lifting platform, a main lifting platform, said forward lifting platform being movable between a lowered position and a raised position by first lifting means, said main lifting platform being movable between a lowered position and a raised position by second lifting means, said second lifting means comprising two spaced apart cables, each of said spaced apart cables having one end attached to said forward lifting platform, each of said spaced apart cables also having a second end operatively connected to said main lifting platform, hoisting means associated with each of said cables, said hoisting means comprising first and second motor means respectively operatively acting on said cables, said first and second motor means when activated being effective to respectively cause said cables to move in order to make said second ends of said cables more nearly approach said one ends of said cables thereby causing said main lifting platform to be raised to the level of said forward lifting platform, synchronizing means for synchronizing movement of said cables, said synchronizing means comprising first and second pulley means over which said spaced apart cables respectively pass, torque tube means connected to said first and second pulley means and fixedly secured thereto as to fixedly rotate with said first and second pulley means, said torque tube means being effective to transmit power as needed from said first pulley means to said second pulley means and from said second pulley means to said first pulley means, and first and second spaced apart lift stabilizing chain means each of which is operatively connected to both said forward lifting platform and said main lifting platform.

2. A cargo loading vehicle according to claim 1 wherein said first and second motor means are each mounted below and operatively connected to for movement with said main lifting platform.

3. A cargo loading vehicle according to claim 1 wherein said second ends of said cables are each respectively directly coupled to said main lifting platform.

4. A cargo loading vehicle according to claim 2 wherein said first and second motor means are respectively operatively connected to first additional pulley means and second additional pulley means, wherein said spaced apart cables respectively pass over said first additional pulley means and said second additional pulley means, and wherein said first and second motor means when activated are effective to respectively move said first additional pulley means and said second additional pulley means in directions generally parallel to the plane of said main lifting platform and concommittently move portions of said spaced apart cables in the same said directions.

5. A cargo loading vehicle according to claim 1 wherein said first and second pulley means are each arranged as to be situated generally vertically below the respective points for connection of said one ends of said spaced apart cables to said forward lifting platform.

6. A cargo loading vehicle according to claim 1 wherein each of said first and second motor means comprises a hydraulic cylinder assembly mounted horizontally beneath said main lifting platform.

7. A cargo loading vehicle according to claim 6 wherein each of said cylinder assemblies are mounted adjacent to the respective sides of said main lifting platform and parallel to the longitudinal axis of said main lifting platform.

8. A cargo loading vehicle according to claim 1 wherein said second lifting means serves to raise said main lifting platform, and wherein said forward lifting platform is raised directly by hydraulic rams.

9. A cargo loading vehicle according to claim 1 and further comprising third and fourth pulley means over which said spaced apart cables respectively pass, wherein said first and second motor means respectively comprise first and second hydraulic cylinder assemblies, wherein said first and second hydraulic cylinder assemblies respectively comprise first and second stable portions each fixedly secured to said main lifting platform as to thereby move in unison with said main lifting platform as said main lifting platform undergoes lowering and raising motions, wherein said first and second hydraulic cylinder assemblies respectively comprise first and second movable portions respectively connected to said first and second stable portions and each movable relatively to said main lifting platform, wherein said third pulley means is operatively connected to said first movable portion, wherein said fourth pulley means is operatively connected to said second movable portion, wherein said first and second pulley means are respectively situated as to be generally directly vertically below such points at which said one ends of said spaced apart cables are connected to said forward lifting platform, wherein said third pulley means is in functional rolling alignment with said first pulley means and laterally spaced therefrom, wherein said fourth pulley means is in functional rolling alignment with said second pulley means and laterally spaced therefrom, and wherein said first and second hydraulic cylinder assemblies are effective when activated to respectively cause said third and fourth pulley means to move some selected distance with respect to said first and second pulley means generally transversely thereof.

* * * * *